United States Patent [19]

Peng

[11] Patent Number: 5,342,137
[45] Date of Patent: Aug. 30, 1994

[54] SWING ARM

[76] Inventor: Chih-Wen Peng, No. 9, Lane 1, Chung Hsing Road, Wu Ku Hsiang, Taipei Hsien, Taiwan

[21] Appl. No.: 2,978

[22] Filed: Jan. 11, 1993

[51] Int. Cl.⁵ ............................................. F16D 3/10
[52] U.S. Cl. .................................. 403/164; 403/119; 403/117; 362/427; 248/122
[58] Field of Search ............... 403/164, 165, 119, 112, 403/113, 117, 278, 192, 193, 199; 248/289.1, 186, 122; 362/285, 287, 418, 419, 427

[56]  References Cited

U.S. PATENT DOCUMENTS

| | | | |
|---|---|---|---|
| 2,242,303 | 5/1941 | Irmischer | 403/113 X |
| 2,488,898 | 11/1949 | Brasty | 362/427 X |
| 3,601,598 | 8/1971 | Horn | 362/418 |
| 4,121,280 | 10/1978 | Chapman et al. | 362/418 |
| 4,347,557 | 8/1982 | Warshawsky | 403/164 X |
| 4,381,538 | 4/1983 | Warshawsky | 362/427 X |
| 4,821,159 | 4/1989 | Pike | 403/164 X |
| 4,880,193 | 11/1989 | Warshawsky | 403/164 X |

Primary Examiner—Randolph A. Reese
Assistant Examiner—Harry C. Kim
Attorney, Agent, or Firm—Bacon & Thomas

[57] ABSTRACT

A swing arm is disclosed including a bottom curved tube, which has a first fitting with an inward bottom staking step and a second fitting with an inside chamber respectively at two opposite ends, a top straight tube, which has a first fitting with an inward bottom staking step and a second fitting with an external stop knob respectively formed at two opposite ends, and a connecting device to connect the first fitting of the top straight tube to the first fitting of the bottom curved tube through a hollow T-shaped rivet joint for permitting the top straight tube to be turned on the bottom curved tube for engaging the external stop knob of the second fitting of the top straight tube into or disconnecting it from the chamber of the second fitting of the bottom curved tube, a first washer retained between one head of the hollow rivet and one bottom staking step, a second washer retained between the other head of the hollow rivet and the other bottom staking step, and two friction washers retained between the staking steps.

4 Claims, 5 Drawing Sheets

SWING ARM

BACKGROUND OF THE INVENTION

The present invention relates to swing arms and relates more particularly to a swing arm for electric wiring.

The fittings or connecting members of the electric wiring tubes of regular illuminators may be worn out easily after extended use. In order to increase the property of wear resistance, copper wiring tubes may be used. However, using copper wiring tubes for making an illuminator will greatly increase the cost of the illuminator. Further, welding process is commonly applied to connect a fitting or connecting member to an electric wiring tube. Connecting two parts together through a welding process will damage the outer appearance of the parts.

SUMMARY OF THE INVENTION

The present invention provides a swing arm which connects two electric wiring tubes together for allowing one to be turned on the other. The electric wiring tube swivel is comprised of a bottom curved tube, which has a first fitting with an inward bottom staking step and a second fitting with an inside chamber respectively made at two opposite ends, a top straight tube, which has a first fitting with an inward bottom staking step and a second fitting with an external stop knob respectively made at two opposite ends, and a connecting device to connect the first fitting of the top straight tube to the first fitting of the bottom curved tube through a "T" figure hollow rivet Joint for permitting the top straight tube to be turned on the bottom curved tube in engaging the external stop knob of the second fitting of the top straight tube into or disconnecting it from the chamber of the second fitting of the bottom curved tube, which is consists of a hollow "T" figure hollow rivet connected between the annular flanges of the first fittings, a first washer retained between one head of the "T" figure hollow rivet and either bottom staking step, a second washer retained between the other head of the "T" figure hollow rivet and the other bottom staking step, and two friction washers retained between the annular flanges. The present invention provides various advantages as outlined hereinafter. The elements of the connecting device are standardized and suitable for mass production in reducing the cost. As the top straight tube and the bottom curved tube are connected by the connecting device through a "T" figure hollow rivet joint, the assembly process is simple and requires little technique. The elements of the connecting device are wear resistant. The connecting device is completely concealed from sight without damaging the outer appearance of the tubes.

DETAILED DESCRIPTION OF THE PREFERRED EMBODIMENT

Figure 1:
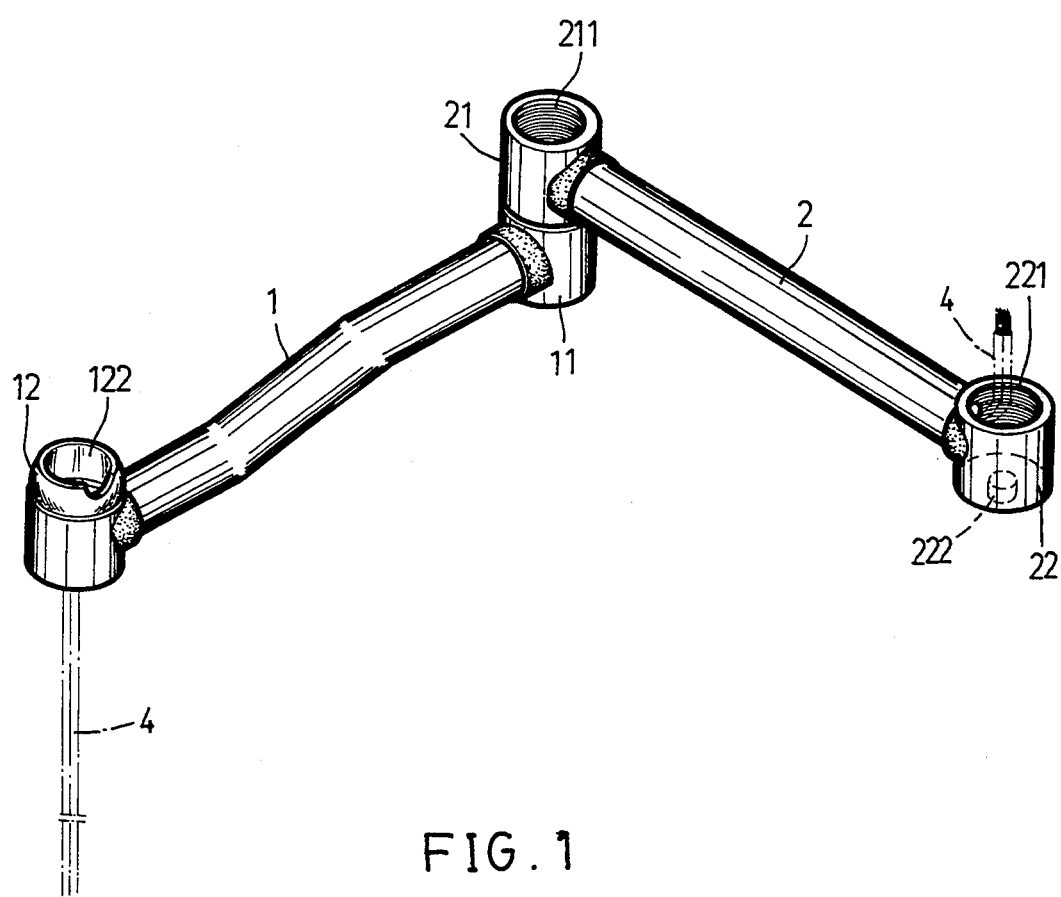
FIG. 1 is an elevational view of the preferred embodiment of the swing arm of the present invention.
Figure 2:
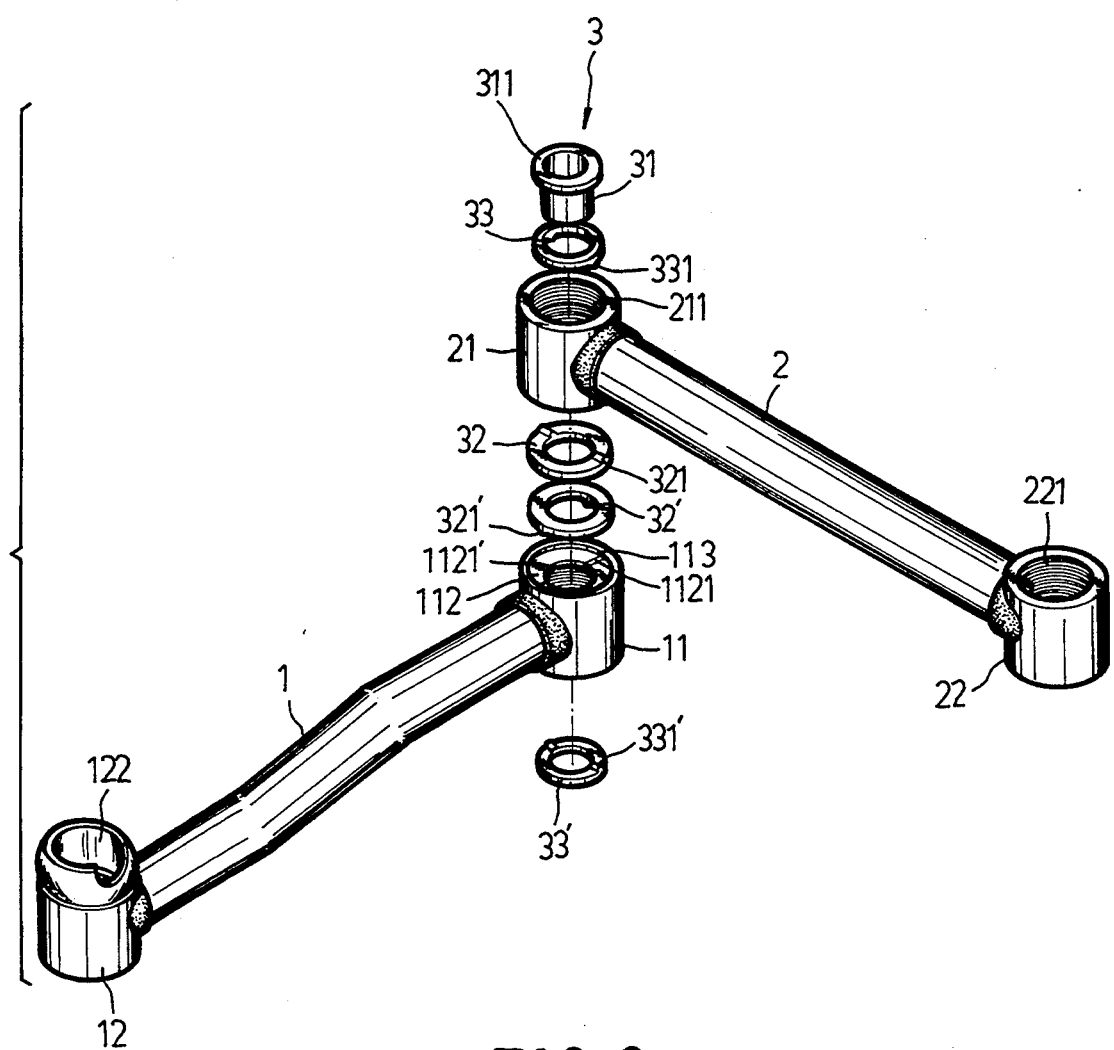
FIG. 2 is an exploded view thereof.
Figure 3:
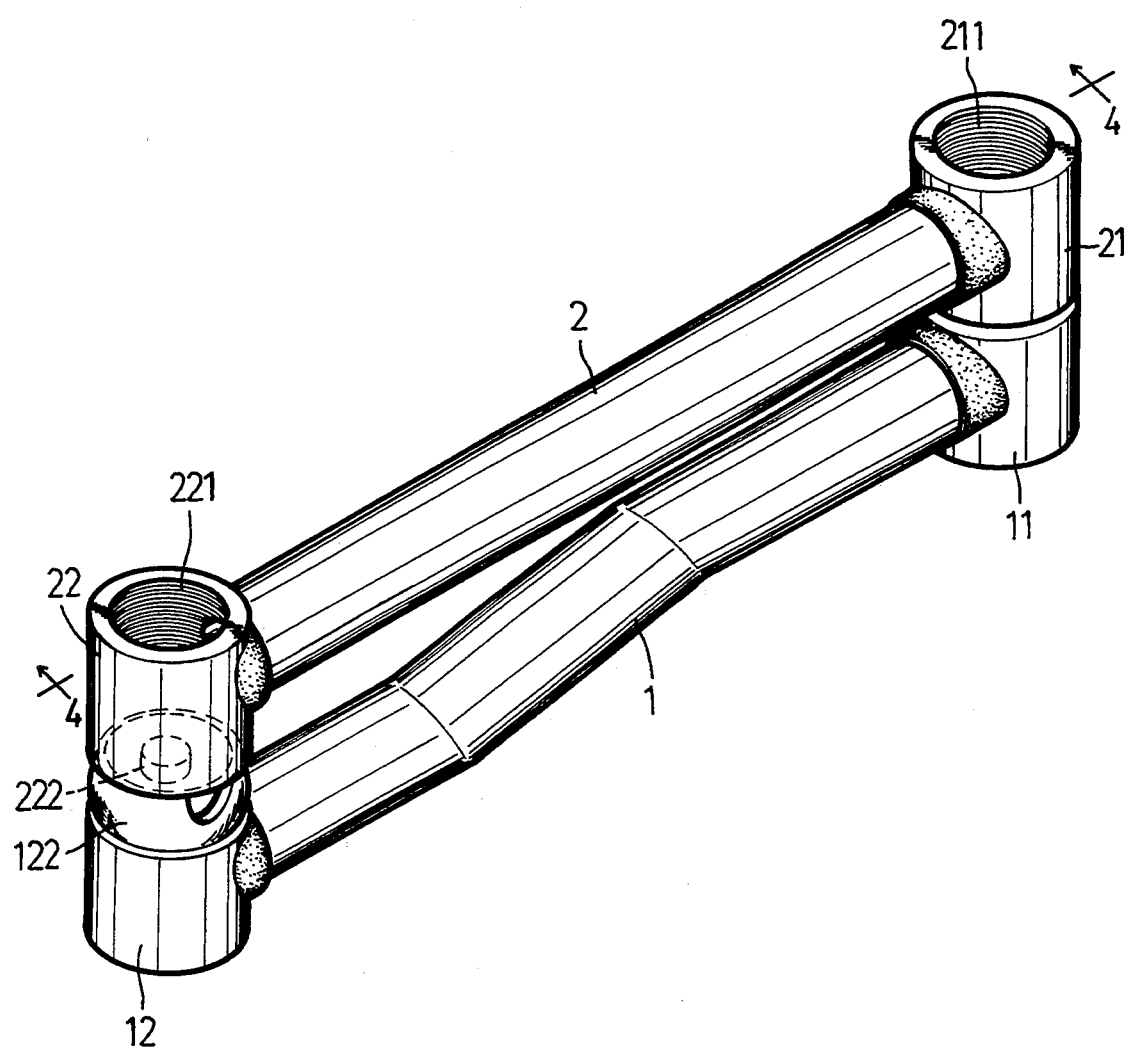
FIG. 3 illustrates the bottom curved tube and top straight tube folded up.
Figure 6:
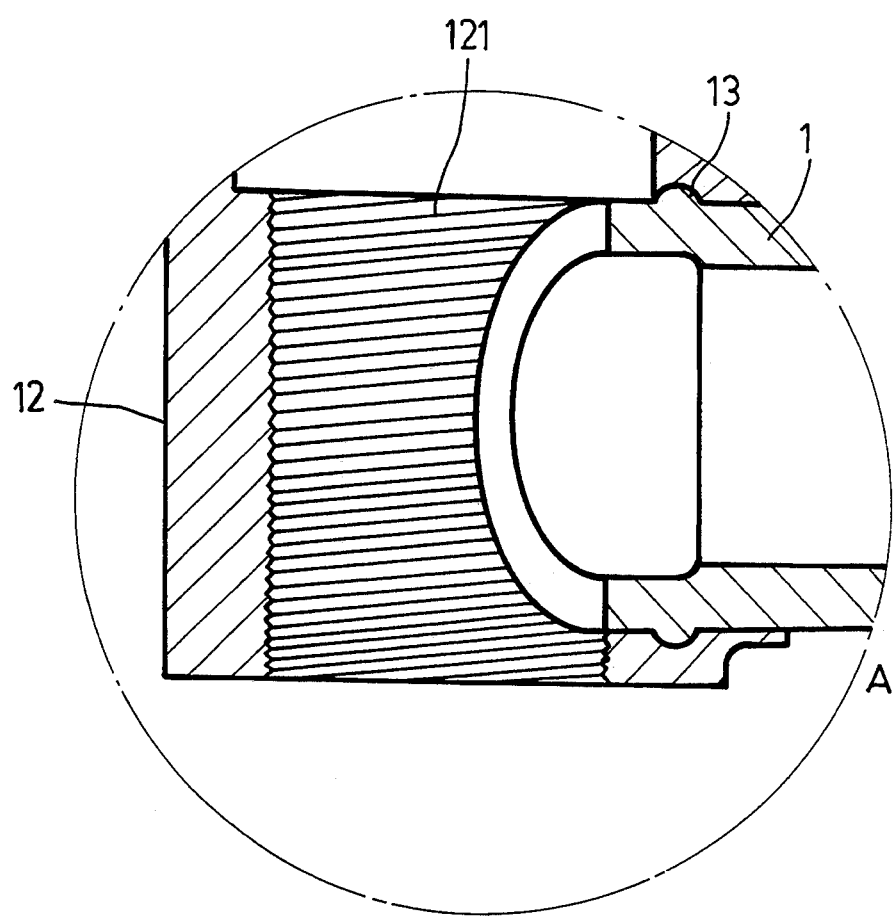
FIG. 6 is an enlarged view of Part A of FIG. 4.

Referring to FIGS. 1 and 2, a swing arm as constructed in accordance with the present invention is generally comprised of a bottom curved tube 1, a top straight tube 2, and a connecting device 3. The bottom curved tube 1 having two opposite beads 13 on each of two opposite ends thereof respectively engaged into respective resesses (not shown) on respective fittings 11 and 12 on the inside (see FIG. 6). Similar to the bottom curved tube 1, the top straight tube 2 has two opposite beads 13 on each of two opposite ends thereof respectively engaged into respective recesses (not shown) on respective fittings 21 and 22. The fitting 11 or 12;21 or 22 has an inner thread 111 or 121;211 or 221. An electric wire 4 can be inserted from the inner thread 121 into the bottom curved tube 1, then inserted through the top straight tube 2 and then extended out of the top straight tube 2 through the inner thread 221. One fitting 11 or 21 of the tube I or 2 has a bottom staking step 112 or 212 on the inside for fastening the connecting device 3. The other fitting 12 of the tube i has a chamber 122, which receives the external stop knob 222 of the other fitting 22 of the top straight tube 2.

Figure 5:
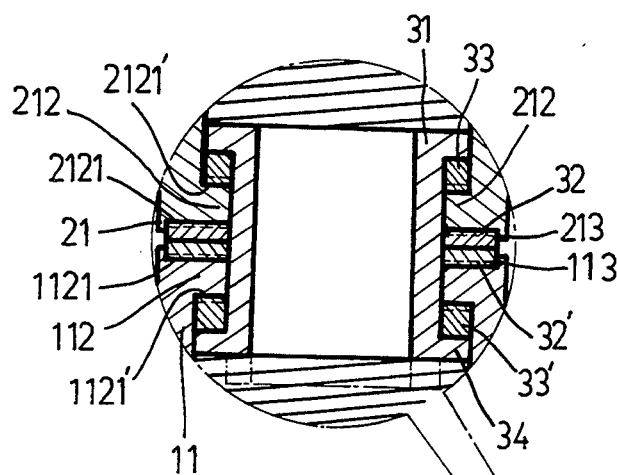
FIG. 5 is a partly sectional view taken from FIG. 4 in an enlarged scale.
Figure 4:
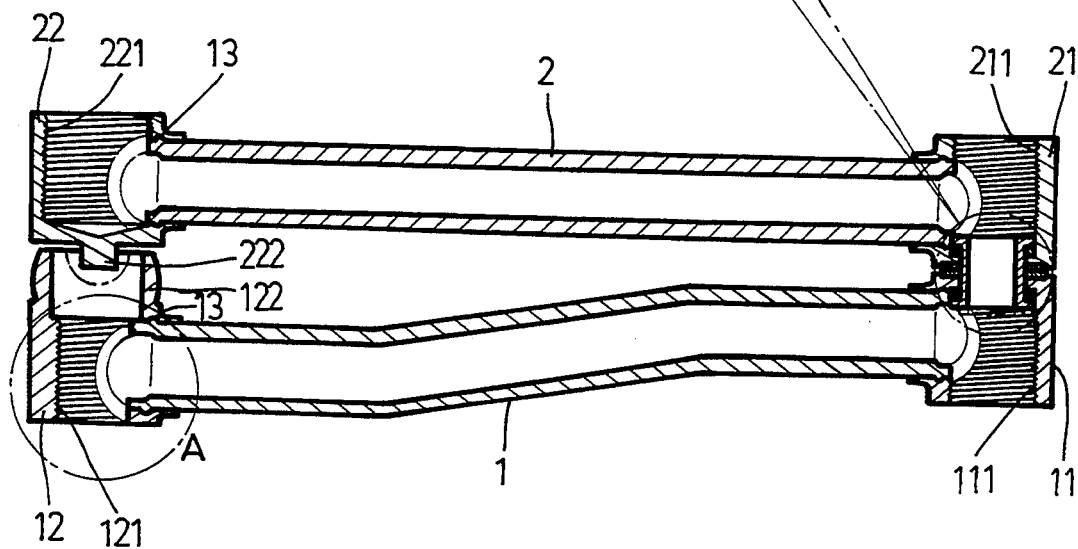
FIG. 4 is a sectional view taken in line 4—4 of FIG. 3.

Referring to FIGS. 4 and 5, and FIG. 2 again, the connecting device 3 consists of a hollow T-shaped rivet 31, two friction washers 32,32', and two washers 33,33'. The hollow rivet 31 is inserted through the inner threads 111,211 and the friction washers 32,32' and washers 33,33' with its head 311 stopped at one washer 33 against the bottom staking step 212 and its bottom end hammered down to form another head 34 stopped at the other washer 33' against the bottom staking step 112. When assembled, the friction washers 32,32' are respectively received in recesses 113,213 on the fittings 11,21 between the staking steps 112,212 and firmly attached together.

The friction washer 32 or 32' has two tips 321 or 321' respectively engaged into recesses 1121 or 2121 on one side of the bottom staking step 112 or 212, and therefore it is prohibited from rotary motion on the respective bottom staking step 112 or 212. Similarly, the washer 33 or 33' has one side tips 331 or 331' respectively engaged into recesses 1121' or 2121' on the other side of the bottom staking step 112 or 212, and therefore it is prohibited from rotary motion on the respective bottom staking step 112 or 212. Further, the thickness of the friction washer 32 or 32' is thicker than the depth of the recess 113 or 213, and therefore the fittings 11,21 do not rub against each other.

What is claimed is:

1. A swing arm comprising:
 a) a bottom curved tube having two opposite ends, first and second fittings connected to the two opposite ends, the first fitting including a bottom staking step and an inner thread below the bottom staking step, the second fitting including a top chamber and an inner thread below the top chamber;
 b) a top straight tube having two opposite ends, first and second fittings connected to the two opposite ends, the first fitting including a bottom staking step and an inner thread above the bottom staking step, the second fitting including an external stop knob at the bottom thereof and an internal thread above the external stop knob;
 c) a connecting device connecting the first fitting of the bottom curved tube to the first fitting of the top straight tube, the connecting device including a T-shaped hollow rivet extending through the staking steps of the first fittings for permitting the top straight tube to be swiveled relative to the bottom curved tube and detachable engagement of the external stop knob of the second fitting of the top straight tube within the chamber of the second fitting of the bottom curved tube, the hollow rivet including two heads on two opposite ends thereof, each head being positioned between the staking step and the inner thread of the first fittings, two first washers wherein each first washer being disposed between each said head and each said staking step of the first fittings, two recesses wherein one recess being formed at the top of the first fitting of the bottom curved tube and other recess being formed at the bottom of the first fitting of the top straight tube, and two second washers wherein each second washer being disposed within each recess and the second washers being in engagement with each other.

2. The swing arm of claim 1 wherein the thickness of each said second washer is greater than the depth of each said recess for spacing the first fittings apart.

3. The swing arm of claim 1 further including:
 a) first cooperating means between each said first washer and each said staking step for preventing relative rotation between the first washers and the staking steps; and
 b) second cooperating means between each said second washer and each said recess for preventing relative rotation between the second washers and the recesses.

4. The swing arm of claim 3 wherein the first and second cooperating means each includes a plurality of projecting rods and a plurality of corresponding recesses.

* * * * *